US011588543B2

(12) United States Patent
Wang et al.

(10) Patent No.: US 11,588,543 B2
(45) Date of Patent: *Feb. 21, 2023

(54) REQUESTING WEATHER DATA BASED ON PRE-SELECTED EVENTS

(71) Applicant: Honeywell International Inc., Morris Plains, NJ (US)

(72) Inventors: Guoqing Wang, Beijing (CN); Haiming Wang, Beijing (CN); Haifeng Wang, Beijing (CN); Danhua Liang, Beijing (CN)

(73) Assignee: Honeywell International Inc., Charlotte, NC (US)

( * ) Notice: Subject to any disclaimer, the term of this patent is extended or adjusted under 35 U.S.C. 154(b) by 325 days.

This patent is subject to a terminal disclaimer.

(21) Appl. No.: 16/887,778

(22) Filed: May 29, 2020

(65) Prior Publication Data

US 2020/0295821 A1 Sep. 17, 2020

Related U.S. Application Data

(63) Continuation of application No. 15/072,210, filed on Mar. 16, 2016, now Pat. No. 10,700,767.

(51) Int. Cl.
*G01W 1/02* (2006.01)
*H04B 7/185* (2006.01)
(Continued)

(52) U.S. Cl.
CPC ......... *H04B 7/18506* (2013.01); *G01C 21/20* (2013.01); *G01S 7/003* (2013.01);
(Continued)

(58) Field of Classification Search
CPC ..... H04B 7/18506; G01C 21/20; G01S 7/003; G01S 13/951; G01S 13/953; G01W 1/00;
(Continued)

(56) References Cited

U.S. PATENT DOCUMENTS 6,937,937 B1 8/2005 Manfred et al.
7,027,898 B1 4/2006 Leger et al.
(Continued)

FOREIGN PATENT DOCUMENTS

EP 2256957 A2 12/2010
EP 2515147 A2 10/2012
(Continued)

OTHER PUBLICATIONS

Laseref I, Inertial Reference System, Product Description, Honeywell, Apr. 2012, 34 pp.
(Continued)

*Primary Examiner* — Chuong A Ngo
(74) *Attorney, Agent, or Firm* — Shumaker & Sieffert, P.A.

(57) ABSTRACT

A ground weather center may transmit information requests that carry at least one meteorological specific triggering command. An airborne system may translate the triggering command into detectable meteorological conditions and may arm the trigger(s) for specific weather sensors accordingly and downlink information upon the airborne system detects the triggering conditions. By using such a triggering command, the airborne system may be able transmit the same amount of valuable information with less bandwidth by reducing the number of redundant downlinked packets.

20 Claims, 5 Drawing Sheets

(51) Int. Cl.
*G01C 21/20* (2006.01)
*G01W 1/00* (2006.01)
*G08G 5/00* (2006.01)
*G01S 13/95* (2006.01)
*G01S 7/00* (2006.01)

(52) U.S. Cl.
CPC .......... *G01S 13/951* (2013.01); *G01S 13/953* (2013.01); *G01W 1/00* (2013.01); *G01W 1/02* (2013.01); *G08G 5/0013* (2013.01); *G08G 5/0026* (2013.01); *G08G 5/0091* (2013.01); *G01W 2001/006* (2013.01); *G06T 2207/30192* (2013.01); *Y02A 90/10* (2018.01)

(58) Field of Classification Search
CPC ............. G01W 1/02; G01W 2001/006; G08G 5/0013; G08G 5/0026; G08G 5/0091; G06T 2207/30192; Y02A 90/10
See application file for complete search history.

(56) References Cited

U.S. PATENT DOCUMENTS

| | | | |
|---|---|---|---|
| 7,181,345 | B2 | 2/2007 | Rosenfeld et al. |
| 8,085,182 | B2 | 12/2011 | Kauffman |
| 8,217,828 | B2 | 7/2012 | Kirk |
| 8,314,730 | B1 | 11/2012 | Musiak et al. |
| 8,604,963 | B1 | 12/2013 | Kronfeld et al. |
| 8,615,337 | B1 * | 12/2013 | McCusker ............. G01C 21/20 701/4 |
| 8,798,817 | B2 | 8/2014 | O'Dell et al. |
| 9,057,773 | B1 | 6/2015 | Fersdahl et al. |
| 9,071,677 | B2 | 6/2015 | Aggarwal et al. |
| 9,134,418 | B1 | 9/2015 | Kronfeld et al. |
| 9,223,020 | B1 | 12/2015 | Crosmer et al. |
| 9,331,780 | B1 | 5/2016 | Zhou et al. |
| 9,869,766 | B1 | 1/2018 | Breiholz et al. |
| 2007/0225835 | A1 | 9/2007 | Zhu |
| 2011/0255506 | A1 | 10/2011 | Toth et al. |
| 2012/0266094 | A1 | 10/2012 | Starr et al. |
| 2013/0234884 | A1 | 9/2013 | Bunch et al. |
| 2013/0272150 | A1 | 10/2013 | Wan et al. |
| 2013/0297103 | A1 | 11/2013 | Baker et al. |
| 2014/0222996 | A1 | 8/2014 | Vasseur et al. |
| 2014/0222998 | A1 | 8/2014 | Vasseur et al. |
| 2014/0257598 | A1 | 9/2014 | Bailey et al. |
| 2014/0336935 | A1 | 11/2014 | Zhu et al. |
| 2014/0358441 | A1 | 12/2014 | Hale et al. |
| 2015/0199136 | A1 | 7/2015 | Faulkner et al. |
| 2015/0304191 | A1 | 10/2015 | Groenendijk et al. |
| 2015/0325017 | A1 | 11/2015 | Fletcher et al. |
| 2015/0336676 | A1 | 11/2015 | McCann et al. |
| 2016/0112894 | A1 | 4/2016 | Lau et al. |
| 2016/0173963 | A1 | 6/2016 | Filson et al. |
| 2016/0189079 | A1 | 6/2016 | Gajdzinski et al. |
| 2017/0166219 | A1 | 6/2017 | Jammoussi et al. |
| 2017/0272148 | A1 | 9/2017 | Wang et al. |

FOREIGN PATENT DOCUMENTS

| | | |
|---|---|---|
| EP | 2933663 A2 | 10/2015 |
| EP | 2937714 A1 | 10/2015 |

OTHER PUBLICATIONS

"ARINC 429," Wikipedia, the free encyclopedia, retrieved from https://en.wikipedia.org/w/index php?title=ARINC_429&oldid= 706227720, Feb. 22, 2016, 6 pp.
"Attitude and heading reference system," Wikipedia, the free encyclopedia, retrieved from https://en.wikipedia org/w/index.php?title= Attitude_and_heading_reference_system&oldid=690237721, Nov. 12, 2015, 2 pp.
"Scan," Aviation Today, Avionics, Apr. 1, 2006, 6 pp.
"Aviation transponder interrogation modes," Wikipedia, the free encyclopedia, retrieved from https://en.wikipedia.org/w/index.php? title=Aviation_transponder_interrogation_modes&oldid= 699311358, Jan. 11, 2016, 4 pp.
"Next Generation (NextGen) Air Transportation System," National Weather Service, Aviation Weather Services, May 18, 2010, 2 pp.
"Thunderstorm Formation and Aviation Hazards," NOAA's National Weather Service, The Front, Jul. 2011, 11 pp.
"Cockpit Systems & Displays, Avionics For Any Application," Product Listing, Honeywell Aerospace, retrieved from https://aerospace.honeywell.com/product-listing/cockpit-systems-and-displays on Mar. 16, 2016, 5 pp.
"Communication Management Unit," Wikipedia, the free encyclopedia, retrieved from https://en.wikipedia.org/w/index.php?title= Communication_Management_Unit&oldid=709971244, Mar. 14, 2016, 5 pp.
Kaur et al., "Implementation and Comparison of Data Link Quality Scheme on ODMRP and ADMR in MANETs," International Journal of Next-Generation Networks (IJNGN), vol. 3, No. 3, Sep. 2011, 8 pp.
"Flight Management System Weather Input Optimizer Final Report," GE Aviation Systems LLC, U.S. Department of Transportation, Federal Aviation Administration, May 2014, 21 pp.
"Data Link Solutions for Business and General Aviation," Honeywell Aerospace, Technical White Paper, Oct. 2012, 6 pp.
"Indian Remote Sensing," Wikipedia, the free encyclopedia, retrieved from https://en.wikipedia.org/w/index.php?title=Indian_Remote_ Sensing&oldid=682076321, Sep. 21, 2015, 5 pp.
"LSZ-860 Lightning Sensor System, Striking back at severe weather," Honeywell Aerospace, Apr. 2006, 4 pp.
"Technical Overview For Mark III Communications Management Unit (CMU)," Honeywell Aerospace Electronic Systems, Jul. 23, 2002, 59 pp.
"Primus 880 Weather Radar, Reliable Weather Avoidance Radar," Honeywell Aerospace, Oct. 2005, 6 pp.
"Primus Epic Radio System, Flexibility for Communication and Navigation," Product Listing, Honeywell Aerospace, retrieved from https://aerospace.honeywell.com/products/safety-and-connectivity/ primus-epic-radio-system on Mar. 16, 2016, 4 pp.
"Primus Epic/Primus Epic 2.0, Primus Epic Integrated Avionics," Product Listing, Honeywell Aerospace, retrieved from https://aerospace.honeywell.com/products/cockpit-systems/primus-epic on Mar. 16, 2016, 7 pp.
"RDR 2100," Product Listing, BendixKing by Honeywell, retrieved from http://www.bendixking.com/Products/Safety/Weather/RDR-2100 on Mar. 16, 2016, 3 pp.
"VHF Data Link," Wikipedia, the free encyclopedia, retrieved from https://en.wikipedia.org/w/index.php?title=VHFData_Link&oldid= 698973906, Jan. 9, 2016, 3 pp.
Vanwagenen, "Into the Eye of the Storm: IntuVue RDR-4000 3-D Radar," Aviation Today, Avionics, Aug. 19, 2014, 3 pp.
"Flying the Weather And Not Letting the Weather Fly You," Notre Dame Pilot Initiative, Feb. 8, 2012, 22 pp.
Dillow, "To Test the Cutting Edge In Weather Radar, PopSci Goes Storm Chasing in an Airplane," Popular Science, retrieved from http://www.popsci.com/technology/article/2012-08/test-cutting-edge-weather-radar-popsci-goes-storm-chasing-airplane, Aug. 9, 2012, 5 pp.
"Weather Radar, Reducing Weather Delays," Product Listing, Honeywell Aerospace, Video available at https://aerospace.honeywell.com/en/ product-listing/weather-radar, retrieved on Mar. 16, 2016, 4 pp.
Quality of Data Link Service, Data Link Provider Interface (DLPI), The Open Group, 1997, 14 pp. (Applicant points out, in accordance with MPEP 609.04(a), that the year of publication, 1997, is sufficiently earlier than the effective U.S. filing date, Mar. 16, 2016, so that the particular month of publication is not in issue.).
Communication Pursuant to Rules 70(2) and 70a(2) EPC with reference to Rule 39(1) dated Sep. 25, 2017 from counterpart European Application No. 17155933.9, 2 pp.
Extended Search Report from counterpart European Application No. 17155933.9, dated Jul. 14, 2017, 7 pp.
Intent to Grant dated Aug. 29, 2018, from counterpart European Application No. 17155933.9, 35 pp.

(56) References Cited

OTHER PUBLICATIONS

Prosecution History from U.S. Appl. No. 15/072,210, dated Oct. 20, 2017 through Apr. 29, 2020, 243 pp.
Ramohalli et al., "The Honeywell on-board diagnostic and maintenance system for the Boeing 777," Digital Avionics Systems Conference, Oct. 5-8, 1992, 2 pp. (Abstract Only).

* cited by examiner

REQUESTING WEATHER DATA BASED ON PRE-SELECTED EVENTS

This application is a continuation of U.S. patent application Ser. No. 15/072,210, which was filed on Mar. 16, 2016, and is entitled, "REQUESTING WEATHER DATA BASED ON PRE-SELECTED EVENTS," the entire content of which is incorporated herein by reference.

TECHNICAL FIELD

The disclosure relates to weather information systems.

BACKGROUND

The connected weather radar concept allows a ground device of a weather data collection and prediction system to acquire timely and accurate meteorological information from commercial, private, or other aircraft equipped with weather radar and other sensors. The information received from the aircraft may serve as a supplement to other ground and/or space-based data sources. A connected weather system may acquire weather data from multiple sources, including aircraft, for ground aggregation and analysis. The synthetized weather data may then be uplinked to aircraft in a given area, for example, to aid in avoiding weather hazards, to plan routes, to choose an altitude for a more comfortable ride for passengers, or other such uses. A system that downlinks weather data from aircraft based on a "request and respond" mechanism typically results in multiple request and response sessions, with the downlinked data often containing a significant portion of low value or redundant information. Datalink bandwidth can be a limited resource, and a request and respond mechanism may consume valuable bandwidth transmitting low value data.

SUMMARY

In one example, this disclosure is directed to a method that includes receiving, at a computing device on board an aircraft, at least one triggering command; translating, by the computing device, the at least one triggering command into one or more meteorological criteria; receiving, by the computing device, a plurality of weather sensor inputs from one or more weather sensors on-board the aircraft; determining, by the computing device, whether the plurality of weather sensor inputs satisfy the meteorological criteria; obtaining, by the computing device, meteorological data; and in response to determining that the plurality of sensor inputs satisfy the meteorological criteria, initiating a downlink of at least a portion of the meteorological data.

In another example, this disclosure is directed to an aircraft-based weather system including an aircraft; one or more weather sensors; a communication unit configured to receive at least one triggering command; and a computing device configured to: translate the at least one triggering command into one or more meteorological criteria; receive weather sensor inputs from the one or more weather sensors; determine whether the plurality of weather sensor inputs satisfy the meteorological criteria; obtain meteorological data; and in response to determining that the plurality of sensor inputs satisfy the meteorological criteria, initiate, via the communication unit, a downlink of at least a portion of the meteorological data.

In another example, this disclosure is directed to a ground-based weather system that includes a computing device configured to determine meteorological data to obtain from an aircraft; determine one or more meteorological criteria for obtaining the meteorological data; translate the one or more meteorological criteria into at least one triggering command; a communication unit configured to transmit the at least one triggering command to the aircraft.

DETAILED DESCRIPTION

A connected weather system allows a ground device to acquire timely and accurate meteorological information by using sensor-equipped aircraft as probes. Information from the aircraft may serve as a supplement to other ground- or space-based weather data sources. The connected weather system acquires weather data, including weather radar information from aircraft, for ground aggregation and analysis. The synthetized weather data may be uplinked to the same or different aircraft for a future application, such as avoiding bad weather or turbulence for either safety reasons or for passenger comfort. Also, an aircraft may preprocess data on a meteorological event and downlink dimensional information not available to the ground device. For example, an aircraft may determine the base altitude of a cumulonimbus which may not be available to ground-based radar because of terrain blockage, earth curvature, or other reasons.

A system that downlinks weather data from aircraft based on a request and respond mechanism typically requires multiple request and response sessions to transmit desired weather data. For example, for one pair of start and stop requests for multiple data response packets, it is possible that only one or a few of the data response packets contains the data the ground device intended to collect, while the majority of the downlinked data contains only low value or redundant packets. Datalink bandwidth may be a cost-sensitive resource for aircraft, and a request and respond mechanism may undesirably consume limited bandwidth for low value data. The techniques of this disclosure may reduce the amount of bandwidth consumed transmitting low value data. For example, when a ground device requests 3D reflectivity data from an aircraft on-board weather radar over satellite communication (SATCOM), the 3D reflectivity data may consume up to 16 k bytes without data compression. Minimizing the number of images transmitted, particularly by reducing the number of images that include no or only limited useful information, may reduce an aircraft's weather-related bandwidth consumption, or additionally or alternatively, allow for the same weather-related bandwidth consumption but utilize that bandwidth to transmit higher value data.

As another example, the ground device may track a cold front movement as indicated by a weather chart and need to understand the exact location of the front transition at a certain altitude. The ground device may be aware of a member aircraft flying toward the front boundary at the altitude of interest. In an example request and response technique using known solutions, the ground element may request the aircraft to start downlink static air temperature data, wind speed and direction data, together with time and position data every ten seconds in the next half an hour. The ground device may monitor and analyze this data until the ground device is able to determine an exact position of the front. Downlinking these data packets every ten seconds consumes valuable bandwidth, and the packets of interest may only be a small fraction of the total data packets transmitted. As will be explained in greater detail below, the techniques of this disclosure may reduce the number of data packets that are transmitted in order to convey, from the aircraft to the ground station, the desired information.

According to one technique of this disclosure, a ground station may transmit to an aircraft a request that includes at least one meteorological specific triggering command. For example, the request may simply contain the request "detect weather front boundary." The airborne system may translate the triggering command into detectable conditions, such as a change in temperature of more than fifteen degrees. The airborne system may arm the trigger(s) accordingly and downlink the requested front boundary position information once the airborne system detects the triggering condition(s). By using such a triggering command, the airborne system may be able to reduce the amount of packets that are transmitted with redundant or non-useful information, and therefore, transmit the same amount of valuable information but while consuming less bandwidth.

Other meteorological phenomena may be detected and tracked using the techniques of this disclosure. Some other examples potentially include detecting a freezing level during climb or descent or determining turbulence regions while cruising. The corresponding downlink may be an altitude value (e.g., accompanied by average lapse rate information) and a boundary pair in positions (together with turbulence level rating). The triggering request may optionally contain the specific information requested, rather than the airborne system translating the request into specific conditions. An aircraft may also communicate weather data to a ground element using voice communication, such as through a pilot report (PIREP).

Figure 1A:
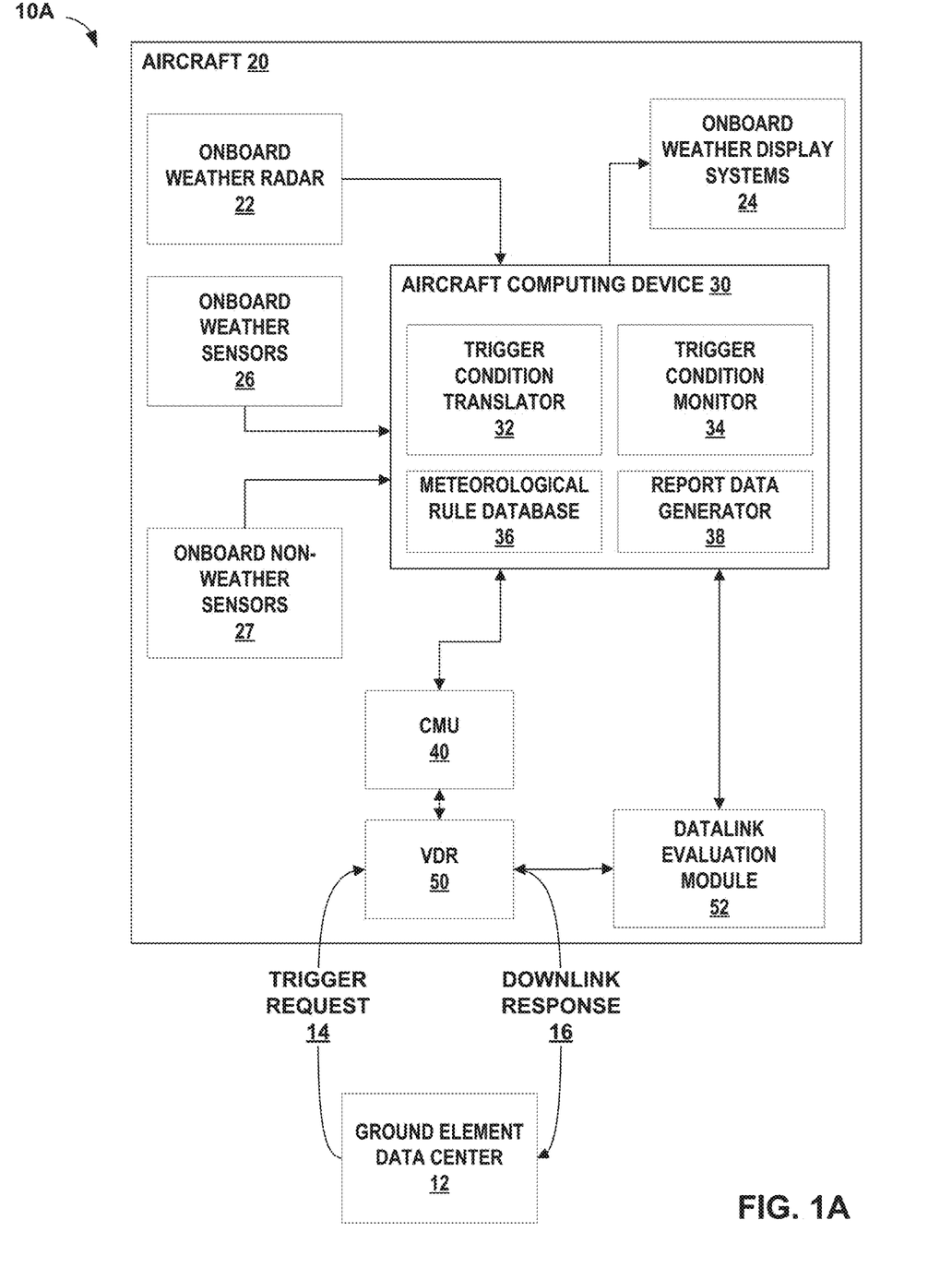
FIG. 1A is a conceptual and schematic block diagram illustrating an example connected weather system, in accordance with one or more aspects of the present disclosure.

FIG. 1A is a conceptual and schematic block diagram illustrating an example connected weather system 10A that includes a ground element data center 12 ("data center 12") communicating with an aircraft 20. As will be explained in more detail below, aircraft 20 is configured to receive a triggering command (trigger request 14 in FIGS. 1A and 1B) from data center 12 and to transmit downlink response 16 to data center 12.

Data center 12 represents one or more weather data collection, aggregation, and analysis centers. Data center 12 may collect information from sources such as weather satellites, ground-based weather data collection systems, which may be automated or manned, regional weather radar centers, weather balloons, aircraft, and other sources. Data center 12 may collate, aggregate, analyze, and synthesize weather information and provide this weather information to a variety of customers including government and civilian weather reporting services and aircraft. Data center 12 may, for example, provide weather information via phone call, online through the internet, through broadcast, such as an Airmen's Meteorological Information (AIRMET) broadcast or Significant Meteorological Information (SIGMET) broadcast (for severe weather), or uplink to aircraft. Aircraft pilots may use this information for to plan routes, to avoid severe weather, or to provide for a more comfortable passenger ride by avoiding turbulence.

Aircraft 20 may contain onboard weather radar 22, onboard weather sensors 26, onboard weather display systems 24, and one or more computing devices 30 that may communicate to the ground element through a data link such as very high frequency (VHF) data radio (VDR) 50. Aircraft 20 may also include a communications management unit (CMU) 40 and datalink evaluation module 52. In this disclosure, aircraft 20 is generally described to be an airplane, but in various implementations aircraft 20 may also be a helicopter, balloon device, satellite device, unmanned aerial device, or any other machine configured to fly.

Onboard weather radar 22 may be two-dimensional (2D) or three-dimensional (3D) and may have simple or complex processing capability. For example, if aircraft 20 is an airplane, then weather radar 22 may include an antenna mounted in the nose of the plane that sends a flat, horizontal beam into the space in front of aircraft 20 and senses the signal that bounces back off of objects, such as clouds in the sky. Pilots may tilt the radar beam up or down to sample a different slice of the sky. Weather radar 22 may have altitude compensated tilt (ACT) that may allow easier detection of weather that may affect the aircraft en-route and reduce the amount of tilt management required by the pilot. ACT may read the altitude and selected range and automatically adjusts the tilt with any change in altitude. Weather radar 22 may, for example, implement Doppler processing techniques to detect spectrum spreading caused by turbulence. Weather radar 22 may also have features that alert pilots to areas where storms may be hidden behind other storms. In an example of a 3D radar, weather radar 22 may take a 3D snapshot of the sky for the area forward of the aircraft by rapidly panning and tilting the beam to capture radar data from the ground up to a selected altitude. Weather radar 22 may compute that data into a 3D picture of the space in front of the aircraft. Weather radar 22 may predict future movement of severe weather or turbulence.

Aircraft 20 may also include other onboard weather sensors 26 that may collect weather data. Some examples of these sensors include static air temperature sensors, pitot static systems, angle of attack sensors, lightning sensors, or other such weather sensors. Aircraft 20 may additionally include other onboard non-weather sensors 27 that may receive inputs that are translated into data other than weather data. Some examples of non-weather sensors 27 include a terrestrial location sensor, such as GPS, a direction sensor, an altitude sensor. Non-weather sensors 27 may also include an attitude and heading reference system (AHRS) that includes sensors on three axes that provide attitude information for aircraft, including roll, pitch and yaw. Non-weather sensors 27 may also include traditional mechanical gyroscopic flight instruments and other sensors such as an inertial measurement unit (IMU). Non-weather sensors 27 may also include clocks and other timing devices.

Information from weather sensors 26 and/or non-weather sensors 27 may be combined by aircraft computing device 30 to calculate certain data. For example, computing device 30 may calculate the true wind speed and direction at a specific altitude by combining inputs from weather sensors 26 and non-weather sensors 27 that are indicator of relative airspeed along with the aircraft's actual course and speed from the GPS and inertial navigation system and the measured altitude from an altimeter. As another example, onboard weather sensors 26 may include an air pressure sensor and an icing sensor, and computing device 30 may combine inputs from these sensors to determine an altitude where icing begins.

Onboard weather display systems 24 may present weather and other information to a flight crew of aircraft 20. Some examples may include indicators for airspeed and altitude. Information may be displayed on a heads up display (HUD) such as an electro-optical overhead unit that may generate an image overlay on the windscreen to provide the flight crew with head-up, real-time flight and aircraft performance data. Other examples may include a multi-function display (MFD) that may combines weather radar, traffic, terrain, navigation map and other data into a single display instrument or a control display unit (CDU) that combines information display with controls for the flight crew to interact with a flight management system (FMS).

Aircraft 20 may include one or more computing devices represented by aircraft computing device 30 ("computing device 30"). Aircraft computing device 30 may include one or more processors and one or more memories along with a plurality of modules such as a trigger condition translator 32, a trigger condition monitor 34, a meteorological rule database 36, a report data generator 38, and other modules with other functions. The plurality of modules may be implemented in software, firmware, hardware or some combination thereof. For example, the modules in aircraft computing device 30 may be implemented using a microprocessor, digital signal processor (DSP), application specific integrated circuit (ASIC), field programmable gate array (FPGA), or other digital logic circuitry. In some examples, aircraft computing device 30 may include a system on a chip (SoC). Aircraft computing device 30 may include additional modules not shown in FIG. 1A as well as fewer modules than those shown. Moreover, although certain modules have been illustrated as being separate in FIG. 1A, it should be understood that when implemented, such modules may be highly integrated.

Computing device 30 may receive trigger request 14 sent by data center 12. Computing device 30 may compare trigger request 14 to information stored in meteorological rule database 36 and cause trigger condition translator 32 to interpret trigger request 14 into a specific set of instruments and ranges of measurements based on information from meteorological database 36. For example, computing device 30 may receive a trigger request to "note position of thunderstorms along flight path." Meteorological rule database 36 may contain rules for thunderstorm detection that include a threshold value for lightning strikes, convective activity, and turbulence and precipitation levels. Trigger condition translator 32 may convert these rules into (a) a threshold of lightning strikes per minute for the lightning detector (not explicitly shown in FIG. 1A) and (b) setting a range of turbulence detection and precipitation level threshold for the weather radar. Trigger condition translator 32 may communicate these settings to trigger condition monitor 34, weather sensors 26, and weather radar 22.

Trigger condition monitor 34 may continually or periodically monitor onboard weather radar 22, onboard weather sensors 26, and/or onboard non-weather sensors 27 until trigger condition monitor 34 determines all or a sufficient number of the trigger conditions are within the threshold levels. For example, computing device 30, in conjunction with a lightning detector of weather sensors 26, may determine the lightning strikes per minute, and computing device 30, in conjunction with weather radar 22, may determine the turbulence and precipitation levels exceed the threshold communicated by trigger condition translator 32. In response to trigger condition monitor 34 determining that all trigger conditions have been met, aircraft computing device 30 may command report data generator 38 to prepare a report to downlink to data center 12. In some examples, trigger request 14 may contain specific instructions on what information to include in the report, while in other examples, report data generator 38 may determine the contents of the report based on previously programmed instructions.

Although not explicitly shown in FIG. 1A, data center 12 may include one or more modules that store the same information as meteorological rule database 36 and one or more modules that perform the reciprocal functions of condition translator 32. For example, data center 12 may determine that meteorological data obtainable by aircraft 20 that could be useful to the weather data collection, aggregation, and analysis functions be performed by data center 12. Data center 12 may determine a meteorological criteria for which such information may be useful. Data center 12 may translate the meteorological criteria into at least one triggering command and transmit, to aircraft 20, the at least one triggering command. Ground element data center will be discussed in more detail in FIG. 1B.

In one example use case, data center 12 may track a cold front movement. People or systems associated with data center 12 may desire to know a more exact location of the front transition at certain altitude. Rather than data center 12 requesting that aircraft 20 start to downlink static air temperature, wind speed, and direction, together with time and position data every ten seconds in the next half an hour, utilizing the techniques of the present disclosure, data center 12 may send trigger request 12 to aircraft 20 indicating "front detection in the next half an hour." Trigger condition translator 32 can translate trigger request 14 into a set of meteorological criteria to be detected by weather radar 22, weather sensors 26, and non-weather sensors 27. Based on the translation performed by trigger condition translator 32, computing device 30 can arm trigger condition monitor 34, in conjunction with weather radar 22, weather sensors 26, and non-weather sensors 27, to detect air data parameters. Once trigger condition monitor 34 detects a significant static air temperature and/or wind vector gradient within the detection time window, computing device 30, via report data generator 38, may initiate a downlink response 16 until the aircraft passes through the front transition area. In this example, data downlink 16 is activated upon critical event presence, which may reduce the overall amount of data transmitted via the downlink while also increasing the value of the data transmitted during the downlink.

Computing device 30 may track other meteorological phenomena using the same principle described above. Examples of such phenomena include detecting a freezing level during climb or descend or determining a turbulence region during cruise. As on example, if computing device 30 is monitoring for turbulence, upon initiating downlink response 16, computing device 30 may transmit via downlink response 16 an altitude value (e.g. accompanied by average lapse rate information) and a boundary pair in positions (e.g. together with turbulence level rating).

In another example use case, data center 12 may want to determine an update of a squall line. Instead of data center 12 sending up multiple requests for 3D volumetric reflectivity data until a downlink with sufficient weather system radar coverage is acquired, data center 12 may transmit trigger request 14 to aircraft 20. The data acquisition may be made more efficient by uplinking trigger request 14, which may request that aircraft 20 downlink weather data when the weather system is well detected by the onboard weather radar, e.g., the reflectivity on the radar scope exceed certain percentage threshold, or, the onboard system stores and compares data frames and downlinks the most weather coverage frame(s) prior to the aircraft diversion.

Other examples of specific meteorological features include a squall line, a thunderstorm system, a supercell thunderstorm, wind shear, turbulence, a microburst, a warm front or a cold front, a weather front transition boundary, icing conditions and the presence of lightning. Additional examples may include an outflow boundary, which may also be called a gust front. An outflow boundary is similar to a cold front because when an outflow boundary passes a point on the ground, the wind may shift, the temperature and the air pressure may change quickly. Outflow boundaries may travel large distances from the thunderstorm that created them and may cause low level and/or vertical wind shear. An outflow boundary is example of a specific meteorological feature that may be translated into triggering conditions, such as (a) a wind shift combined with (b) a sudden temperature change and (c) a sudden pressure change.

Each of the various specific meteorological features described above may have an associated index value and an associated set of meteorological criteria. As one example, the meteorological feature of a thunderstorm system may have as associated meteorological criteria some combination of an amount of rainfall, a minimum wind speed, a presence of lightning, and other such meteorological criteria. Thus, data center 12 may transmit to aircraft 20 a trigger request 14 that includes an identification (e.g., index values) for one or more specific meteorological features. Aircraft computing device 30 may then translate trigger request 14 into one or more meteorological criteria, based on the one or more index values included in trigger request 14. As triggering request 14 only needs to include an index value, or some other similar type of identification, for a meteorological feature, the amount of data needed to be included in trigger request 14 may be relatively small compared to a system in which all of the meteorological criteria of the specific meteorological feature are individually uploaded to an aircraft.

Also note, an aircraft may pass an outflow boundary in any direction, unlike a point on the ground. For example, if an outflow boundary passes a point on the ground, the temperature may drop suddenly and the pressure may increase suddenly. But an aircraft may pass the outflow boundary in a different direction. For an aircraft passing an outflow boundary in the opposite direction from the outflow boundary direction of travel, the aircraft pressure sensor may detect a sudden pressure drop (instead of increase) and detect a sudden temperature increase (instead of drop). This is opposite to what the sensors on a ground station may detect for the same meteorological condition. Aircraft computing device 30 may set specific triggering conditions depending on the aircraft direction of travel relative to a specific meteorological condition. Other meteorological conditions may have similar considerations for the specific triggering conditions. As one example, aircraft 20 may detect turbulence from a squall line, thunderstorm, or part of some other convective weather system by the using the aircraft inertial system (AHRS/IMU). Depending on the direction of travel, trigger request 14 may be "detect when turbulence is greater than X and decreases to Y." If traveling the other direction, the trigger may be, "detect when turbulence increases to X."

Trigger request 14 in some examples may be a message to aircraft 20 to "detect and report an outflow boundary." Aircraft computing device 30 may translate this form of trigger request into the specific triggering conditions (e.g. pressure, temperature and wind direction) and monitor onboard weather sensors 27 until aircraft computing device 30 detects the specific triggering conditions. In other examples trigger request 14 may include the specific parameters of wind direction, temperature change and pressure change, and so on. The different examples of trigger request 14 may depend on the complexity and capability of different examples of aircraft computing device 30.

Aircraft computing device 30 may modify the contents, timing, resolution, data packet size and other aspects of the report based on information aircraft computing device 30 receives from datalink evaluation module 52. Although shown separately from non-weather sensors 27, datalink evaluation module 52 may be considered to be another type of non-weather sensor. Datalink evaluation module 52 may determine the capability of the datalink to ground data element center 12. For example, datalink evaluation module 52 may determine that there are numerous other aircraft in the area using the same communications link. If there are numerous other aircraft using the same communications link, the volume of data traffic may be high and therefore the bandwidth of the datalink is limited. Datalink evaluation module 52 may also evaluate the quality and stability of a communications link, which may be called quality of service (QoS). Some factors that may impact datalink quality include receiving power, transmission power and distance. Some example measurements may include how often a link disconnects or resets during transfer of data packet, throughput, transit delay, residual error rate and resilience.

Datalink evaluation module 52 may communicate the evaluated capability of the datalink to aircraft computing device 30. Aircraft computing device 30 may take a number of different actions including choosing a different network (e.g., VDR or SATCOM), change the amount of data in downlink response 16 by reducing or increasing the resolution of an image to be downlinked or the size of the geographic area of an image. For example, if trigger request 14 consists of a request for a weather radar image of a meteorological feature, aircraft computing device 30 may reduce amount of data to be downlinked by reducing the size of coverage from one square mile to ½ square mile. Aircraft computing device 30 may use report data generator 38 to change the amount of data in downlink response 16, or may use another module (not shown in FIG. 1A).

Other actions computing device 30, or report data generator 38, may take to change the amount of data transmitted include changing how often to initiate a downlink, sending only metadata for a radar image, rather than the actual image, compressing the data and changing the amount of time covered by the meteorological data portion. For example, if the portion of meteorological data includes seven minutes of information, computing device 30 may instruct report data generator 38 to reduce the portion to cover only a five minute span. Changing the start and stop time of the data coverage may change the size of the portion of data to be transmitted through downlink response 16. If datalink evaluation module 52 determines the datalink is stable with a large available bandwidth, aircraft computing device 30 may include a larger portion of data in downlink response 16.

Additionally, trigger request 14 may define a minimum detection resolution. If the required resolution criteria cannot be met, system 10A may avoid the data transfer cost because data center 12 may not need low resolution data. For example, data center 12 may request high resolution data for a convective weather event detected by other sources. Data center 12 may sent trigger request 14 to aircraft in the vicinity of the convective weather event. Trigger request 14 may define a minimum detection resolution, which may be impacted, for example, by range to the specified weather event. The airborne system may downlink the weather data when the required resolution can be met. If the required resolution criteria cannot be met, aircraft 20 does not send a downlink response. As another example, if the required resolution to the weather event is available in multiple scan cycles, aircraft 20 may store and compare each of the frames within aircraft computing device 30 and only include the data with the best quality in downlink response 16. Note that a "weather event" and a "meteorological event" may also be called a "weather system." "Weather system" in the context of a meteorological event should not be confused with connected weather data system 10A depicted in FIG. 1A.

CMU 40 may interface with other avionics not shown in FIG. 1A, including alerting systems, printers, flight management systems (FMS), SATCOM, VHF Radio, and avionics control and management system (ACMS). CMU 40 may also host a variety of data link applications, including weather data reporting through VDR 50. VDR (VHF data radio) 50 may be one available communication link for aircraft 20. Aircraft 20 may have additional communication links including satellite communication (SATCOM), not shown in FIG. 1A.

FIG. 1A depicts one example of techniques to implement a trigger based weather reporting system in aircraft 20. Other techniques to implement the same or similar system are possible. For example, trigger condition translator 32 and trigger condition monitor 34 may be implemented as separate modules as shown in FIG. 1A or may be implemented as a single module. Datalink evaluation module 52 may be a separate module as shown in FIG. 1A or may be included in one of the other modules, such as part of report data generator 38. In some examples, trigger based weather reporting functions may be implemented as software upgrade to an installed radar processor component or other aircraft computing system. In other examples, trigger based weather reporting functions may also be allocated to other existing equipment or dedicated standalone component. For example, trigger based weather reporting functions may be implemented in ACMS or aircraft condition monitoring function (ACMF) equipment which electrically connects to a CMU and radar processor. In this way, it is possible to retrofit aircraft systems that are currently installed to implement trigger based weather reporting.

Figure 1B:
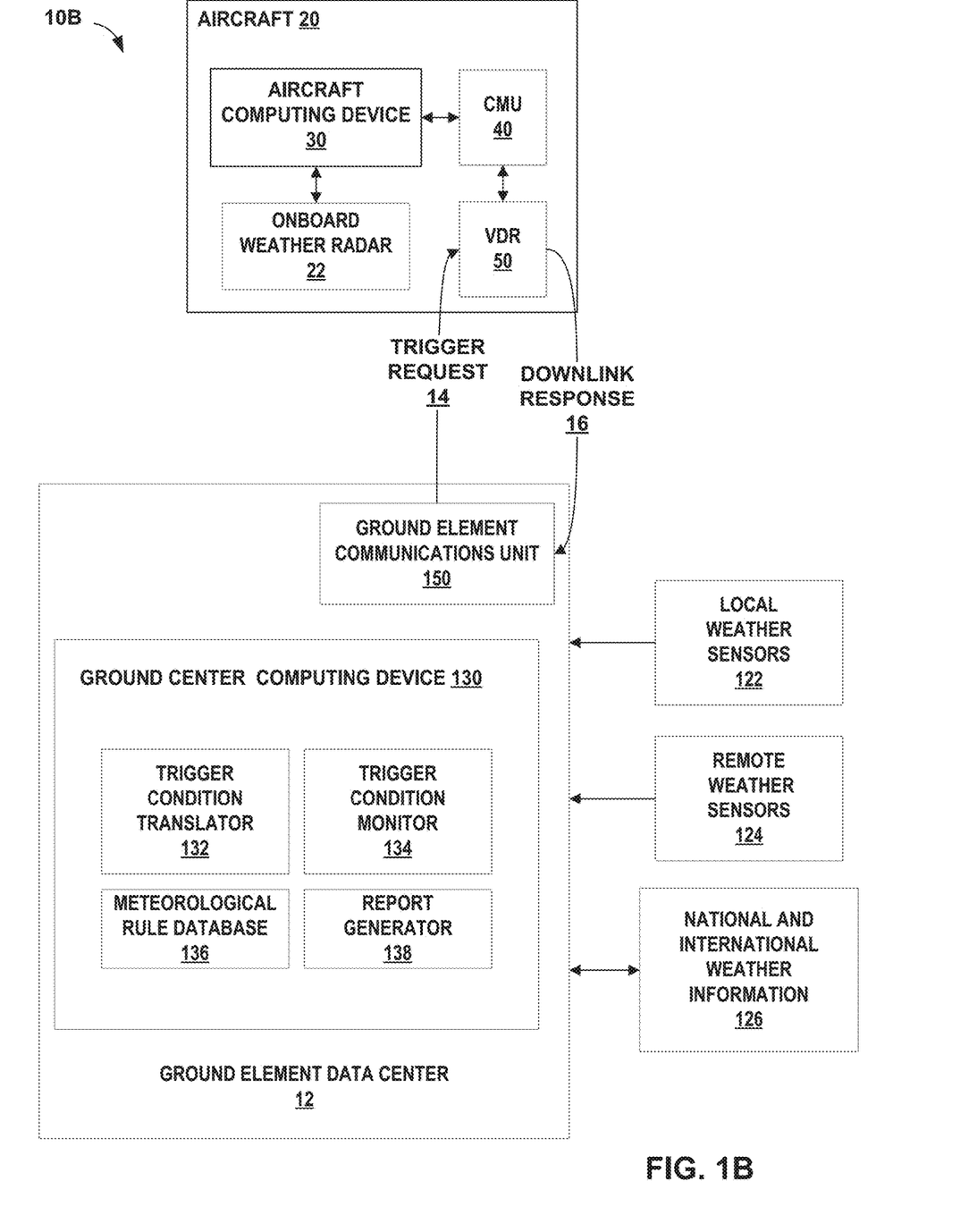
FIG. 1B is a conceptual and schematic block diagram illustrating further details of the connected weather data system of FIG. 1A.

FIG. 1B illustrates connected weather system 10B, which generally corresponds to connected weather system 10A, but additional details of ground element data center 12 shown. Connected weather system 10B includes aircraft 20 in communication with ground element data center 12. Ground element data center 12 may receive information from local weather sensors 122 and remote weather sensors 124 as well as communicate with national and international weather information systems 126.

As described above, aircraft 20 may include VDR 50 connected to CMU 40 for communication with other aircraft systems such as aircraft computing device 30. Aircraft computing device 30 may receive information from and send commands to weather radar 22. VDR 50 may be one example of how aircraft 20 receives trigger requests 14 and transmits downlink response 16 to data center 12, described in more detail in FIG. 1A above.

Ground element data center 12 may include a ground element communication unit 150. In the example of FIG. 1B, communication unit 150 may transmit trigger request 14 to VDR 20 in aircraft 20 and receive downlink response 16 from aircraft 20. As described above, aircraft 20 may have additional communication links not shown in FIG. 1B.

Data center 12 may receive information from local weather sensors 122. In one example, data center 12 may be near an airport. Weather sensors near an airport may include automated weather observation systems (AWOS), automated surface observing system (ASOS) and fully staffed weather stations. These weather stations may include sensors such as radar, barometers, wind speed and direction sensors and other equipment that provide weather data to data center 12. Similarly, remote weather sensors 124 may be automated or staffed weather stations more distant from data center 12. These may include volunteer weather observers and weather observation stations located on high ground or coastal areas.

Data center 12 may communicate with national and international weather information systems 126. For example, data center 12 may collect and analyze weather information from local weather sensors 122 and transmit this information to national and international weather information systems 126. Data center 12 may also receive weather information, flight plan warnings, and other data from national and international weather information systems 126. Data center 12 may transmit this weather information to an aircraft, such as aircraft 20.

Based at least in part on information from local weather sensors 122, remote weather sensors 124 and national and international weather information systems 126, data center 12 may need more information on a meteorological event. For example, weather conditions that may develop into a convective thunderstorm may exist to the west of data center 12. A thunderstorm may be hazardous to aircraft flying near the thunderstorm. Ground center computing device 130 may analyze the weather information and the flight plans of aircraft that may fly near the developing weather conditions to the west. Computing device 130 may determine if a geospatial location of the specific meteorological feature is within a range of detection for a planned flight path of the aircraft. Computing device 130 may determine which meteorological data to obtain from an aircraft and determine one or more meteorological criteria for obtaining the meteorological data. Computing device 130 may develop meteorological trigger conditions by using meteorological database 136 and trigger condition translator 132. Computing device 130 may translate the one or more meteorological criteria into at least one triggering command and transmit triggering command or commands to aircraft 20 via communications unit 150. Some examples of specific meteorological features include, a weather radar reflectivity exceeding a reflectivity threshold, a weather radar image coverage exceeding a coverage threshold, a wind vector gradient being within a wind vector gradient threshold window, a static air temperature being within a static air temperature threshold window, and an air pressure being within an air pressure threshold window.

Computing device 130 may create trigger request 14 to be sent to aircraft 20, which may be flying to the west in the region of the developing conditions. Trigger request 14 may include instructions to detect a specific meteorological feature. As described above, trigger request 14 may be simple or complex, depending on the capability of aircraft computing device 30 onboard aircraft 20. For example, trigger request 14 may include instructions to "detect location of any thunderstorm along flight path." Aircraft computing device 30 may translate the trigger request into specific thresholds for specific sensors such as: convective activity greater than X, barometric pressure change greater than Y, and temperature change greater than ΔT. In other examples, where aircraft computing device 30 is less sophisticated, data center 12 may include the specific threshold for sensors in trigger request 14. As described above for FIG. 1A, computing device 130 may analyze the data link quality and volume of data traffic and adjust trigger request 14 as needed. In other words, computing device 130 may tailor the at least one triggering command to specify the quantity and quality of meteorological information requested from the aircraft. In accordance with techniques of this disclosure, data center 12 may minimize the volume of data sent and received through ground element communications unit 150 to minimize bandwidth use.

Data center 12 may collect downlink response 16 from aircraft 20, as well as any other inbound or outbound aircraft passing near the developing weather conditions to the west. Ground center computing device 130 may monitor the downlink responses 16 from aircraft 20, and other aircraft, analyze and generate weather reports using report generator 138. Data center 12 may transmit reports to aircraft as well as to national and international weather information systems 126. In this way, ground element data center 12 may develop a complete weather picture of a meteorological event while minimizing the limited bandwidth available.

Figure 2:
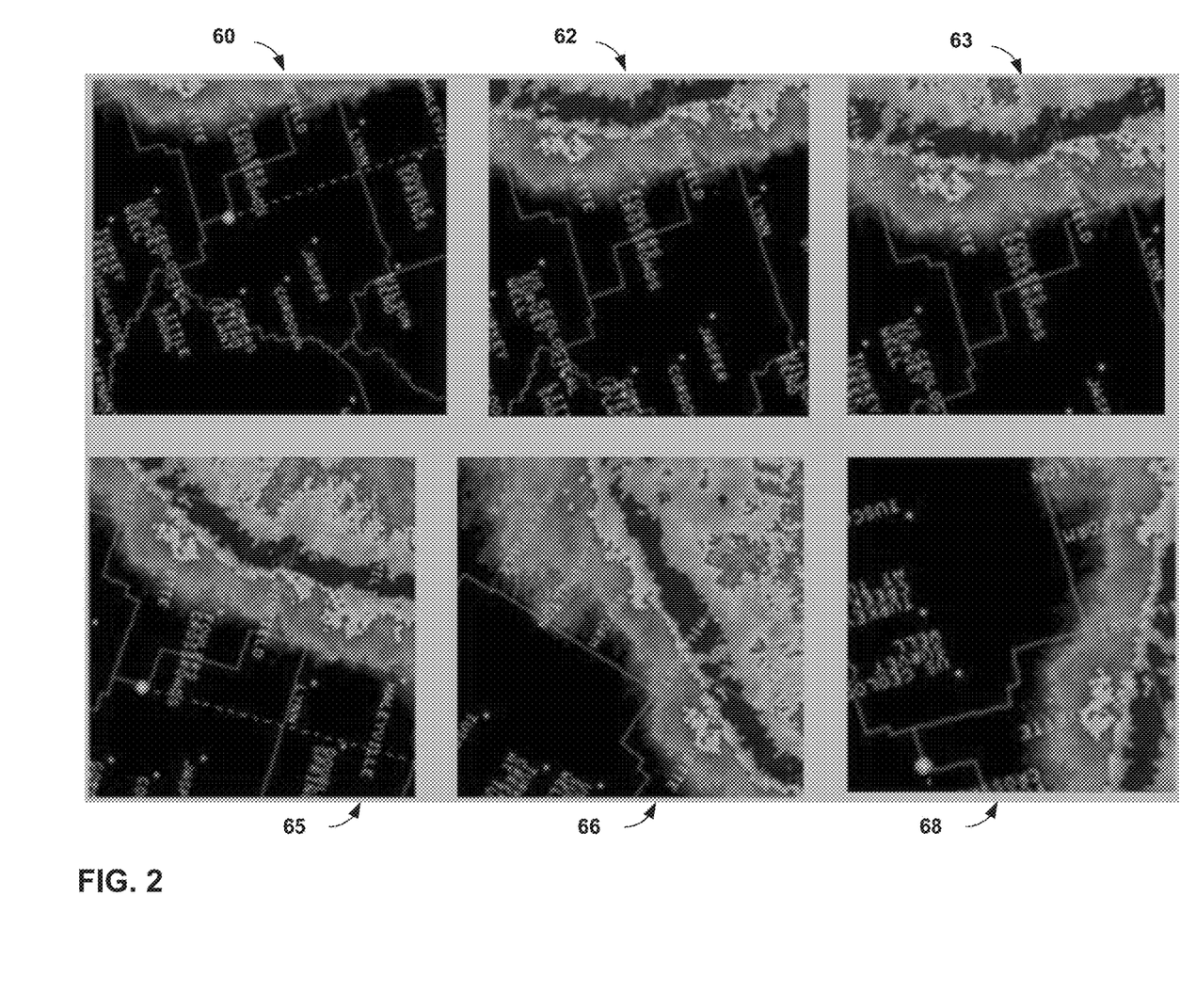
FIG. 2 is a diagram illustrating an example output from a weather radar.

FIG. 2 depicts example images of a meteorological event consisting of a storm cell captured by weather radar 22. In one example, trigger request 14 may include a request to "downlink a snapshot of a specified single squall line only when the weather radar captures the richest convective system data." As aircraft 20 flies near the specified squall line, onboard weather radar 22 may capture a series of images depicted by items 60-68 in FIG. 2. Aircraft computing device 30 may process the images from onboard weather radar 22 and include only item 66 in downlink response 16 because only item 66 captures "the richest convective system data." In the example of FIG. 2, image 60 captures only a small portion of the squall line information. Images 63 and 65 may display a significant portion of the squall line information, but in this example, image 66 may contain the most information of highest value to data center 12. Therefore, aircraft computing system 30 may transmit only that single image 66. In contrast, a request and response system may downlink each of the images 60-68 for data center 12 to evaluate, thereby consuming datalink bandwidth with a significant portion of low value or redundant data packets.

Figure 3:
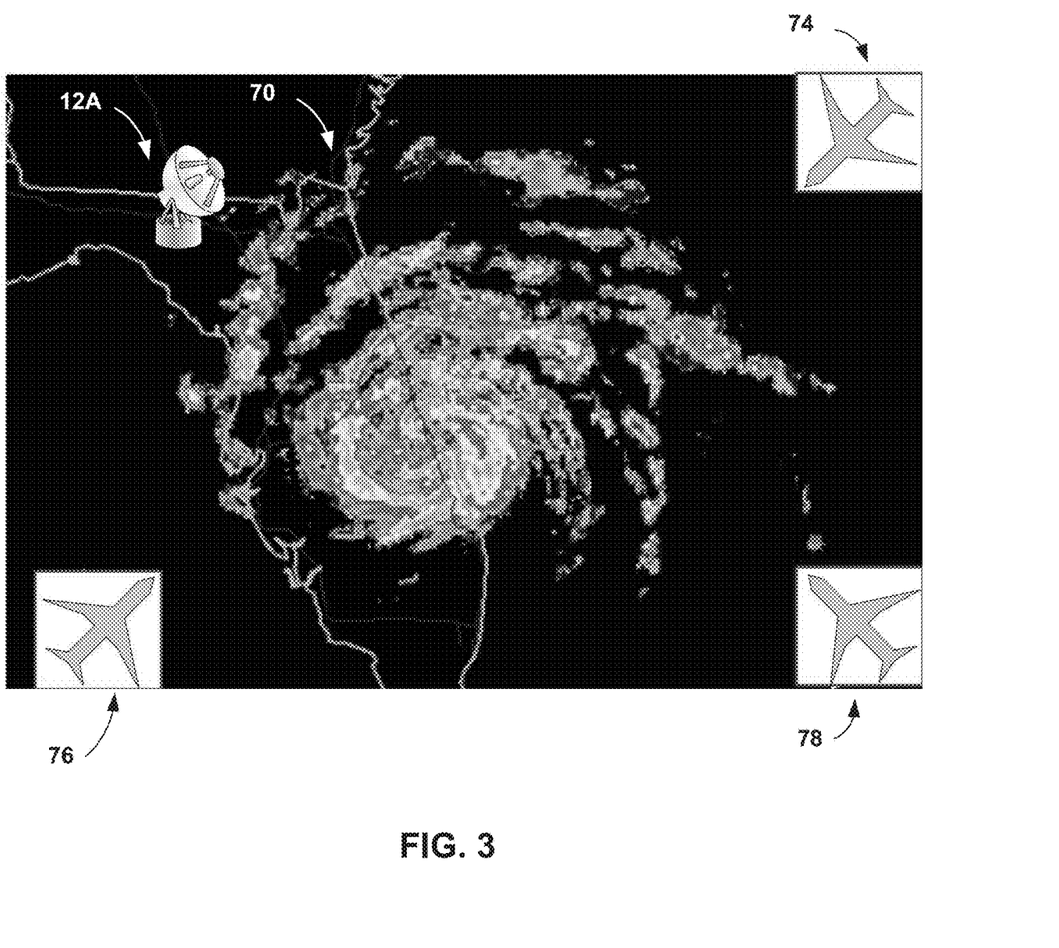
FIG. 3 is a diagram illustrating example weather data collection of a large meteorological event by ground and aircraft.

FIG. 3 is a diagram illustrating an example of a weather event that may be analyzed by a ground element data center and multiple aircraft. Data center 12A, which may include some or all of the functionality described with respect to data center 12, may be tracking and analyzing an example weather event 70, illustrated in FIG. 3 as a hurricane. Data center 12A may transmit a trigger request to any of aircraft 74-78 that may contain a time trigger, a geographic position trigger, or a combination of time and geographic position trigger, in addition to one or more triggers corresponding to meteorological criteria. For example, if ground element data center 12A tracks a large weather system, such as the hurricane depicted by weather event 70, data center 12A may want multiple aircraft to scan the target weather event from different angles or perspectives because a single radar beam may not be able to detect the entire system. Data center 12A may send multiple requests to more than one aircraft for weather data snapshots and use forecast and extrapolation technique to align and put together information pieces.

In some examples, triggering methods may include data center 12A predicting a time when all the participant aircraft are at an optimum position for detecting the target weather event 70 based on available traffic surveillance information and flight plan schedules. Data center 12A may uplink a trigger request to downlink weather data at the specified time. Similarly, data center 12A may uplink a trigger request to downlink weather data when aircraft 74, for example, is at a specific geographic location. In this way, data center 12A may coordinate the weather image scans and other weather data. The weather data and image scans may be associated to a common time, geographic or combination of references, and may result in in higher accuracy without errors or uncertainties that may be introduced in extrapolation processing.

Figure 4:
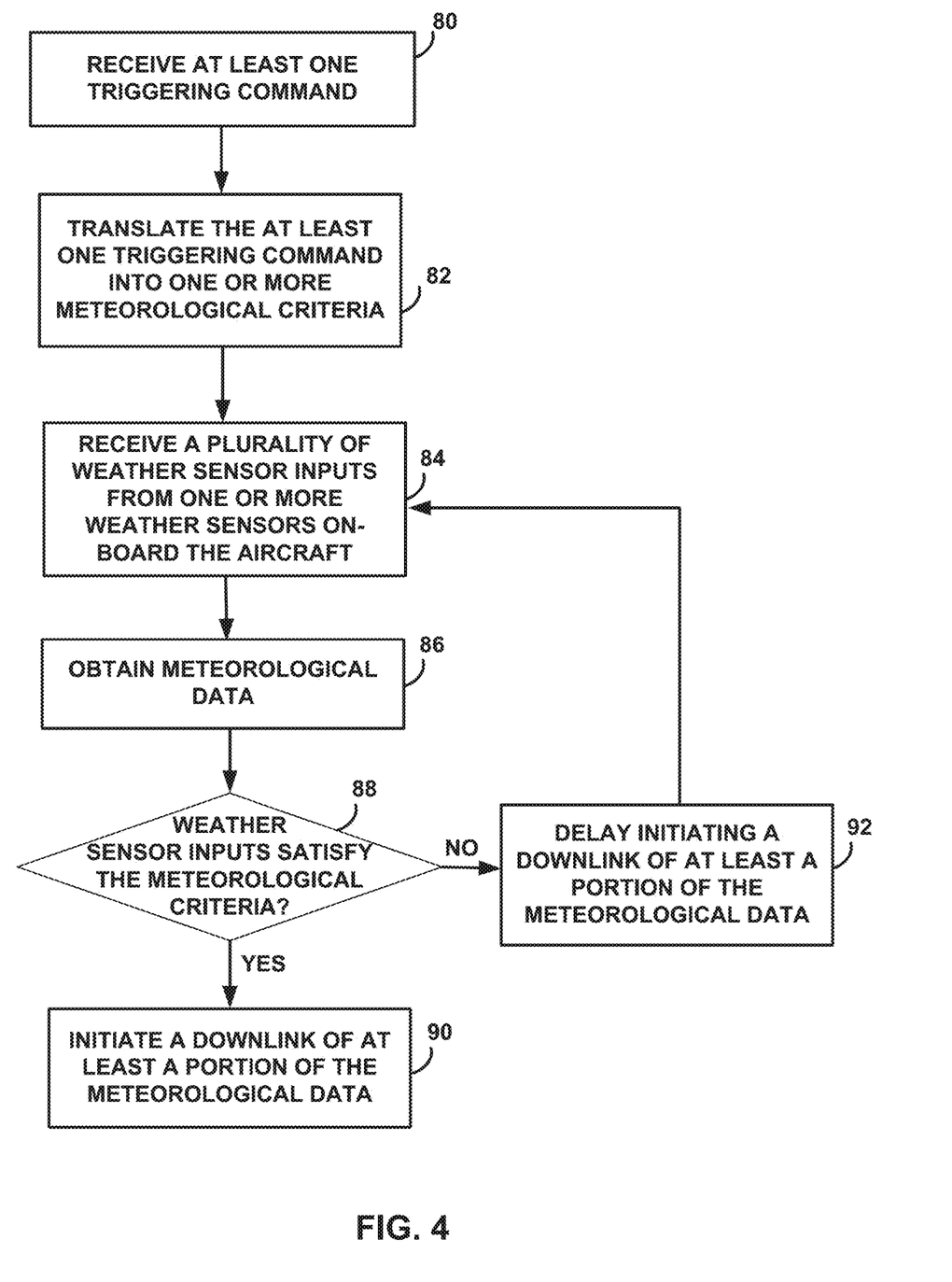
FIG. 4 is a flow chart illustrating techniques of this disclosure.

FIG. 4 is a flowchart illustrating techniques of this disclosure. The techniques of FIG. 4 will be described with respect to system 10 of FIGS. 1A and 1B, although the techniques of FIG. 4, and the techniques of this this disclosure more generally, are not limited to any specific type of system. In the example of FIG. 4, computing device 30 onboard aircraft 20 receives at least one triggering command (80). The at least one triggering command may, for example, be received as part of trigger request 14 and may be a meteorological specific triggering command. Computing device 30 may receive the at least one triggering command from a ground-based device, such as data center 12, while aircraft 20 is in flight. Trigger condition translator 32 of computing device 30, translates the at least one triggering command into one or more meteorological criteria (82). Computing device 30 receives a plurality of weather sensor inputs from weather sensors 26 and/or weather radar 22 on-board aircraft 20 (84). Computing device 30 obtains weather input data from weather radar 22 and weather sensors 26 and from the weather input data obtains meteorological data (86). Trigger condition monitor 34 of computing device 30 determines whether the plurality of weather sensor inputs satisfy the meteorological criteria (88). In response to determining that the plurality of sensor inputs satisfy the meteorological criteria (88, YES), computing device 30 initiates a downlink of at least a portion of the meteorological data (90). In response to determining that the plurality of sensor inputs do not satisfy the meteorological criteria (88, NO), computing device 30 delays initiating a downlink of at least a portion of the meteorological data until the plurality of sensor inputs do satisfy the meteorological criteria (92).

Computing device 30 may also receive, from non-weather sensors 27, a plurality of non-weather sensor inputs and may initiate the downlink of the at least a portion of the meteorological data further in response to determining that at least one non-meteorological criteria is satisfied by the plurality of non-weather sensor inputs. Examples of non-meteorological criteria may include a quality of a communication channel between aircraft 20 and data center 12, an availability of the communication channel between aircraft 20 and data center 12, a location of aircraft 20, a time, or other such non-meteorological criteria.

It should be noted that the weather sensor inputs of step 84 and the meteorological data of 86 may include some of the same information. For example, an air temperate of the air outside of aircraft 20 may be both a weather sensor input used by computing device 30 to determine when to initiate a downlink of meteorological data. The air temperature may also be part of the meteorological data transmitted.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined into hardware unit or provided by a collection of interoperative hardware units, including one or more processors as described above, in conjunction with suitable software and/or firmware.

Various examples have been described. These and other examples are within the scope of the following claims.

The invention claimed is:

1. A ground-based weather system comprising:
a memory;
one or more processors coupled to the memory and configured to:
  determine a specific meteorological feature to be detected, wherein the specific meteorological feature comprises an identification of a convective weather system;
  compare the identification of the specific meteorological feature to information stored in a meteorological rule database, wherein the meteorological rule database includes, for each specific meteorological feature of a plurality of meteorological features stored at the meteorological rule database, a specific set of sensors and ranges of measurements for each sensor of the set of sensors associated with each specific meteorological feature and wherein the specific set of sensors comprises a weather radar;
  translate, based on the comparison, the identification of the specific meteorological feature into one or more meteorological criteria, wherein the one or more meteorological criteria indicate a presence of the specific meteorological feature;
  translate the one or more meteorological criteria into at least one triggering command;
a communication unit configured to transmit the at least one triggering command to the aircraft.

2. The ground-based weather system of claim 1, wherein:
the at least one triggering command comprises instructions to detect the specific meteorological feature, and
the one or more processors are further configured to determine if a geospatial location of the specific meteorological feature is within a range of detection for a planned flight path of the aircraft; and
wherein the specific meteorological feature comprises one or more of:
  weather radar reflectivity exceeding a reflectivity threshold;
  weather radar image coverage exceeding a coverage threshold;
  wind vector gradients being within a wind vector gradient threshold window;
  static air temperature being within a static air temperature threshold window;
  or air pressure being within an air pressure threshold window.

3. The ground based weather system of claim 1, wherein the one or more processors further configured to:
determine a status of a communication channel to the aircraft by measuring:
  a quality of a communication channel between the aircraft and a receiving device,
  an availability of the communication channel between the aircraft and the receiving device, or
  a location of the aircraft; and
in response to the status of the communication channel to an aircraft, tailor the at least one triggering command to specify the quantity and quality of meteorological information requested from the aircraft.

4. The ground based weather system of claim 1,
wherein the communications unit is further configured to transmit a plurality of triggering commands to a plurality of aircraft; and
the one or more processors are further configured to:
determine that a specific meteorological feature is within detection range of the respective flight path of the plurality of aircraft;

receive meteorological data from the plurality of aircraft, wherein the meteorological data provides a multiple source analysis of the specific meteorological feature.

5. A method comprising:
receiving, at a computing device on board an aircraft, at least one triggering command, wherein the at least one triggering command comprises an identification of a specific meteorological feature and a request to downlink an indication of the specific meteorological feature;
comparing, by the computing device, the identification of the specific meteorological feature to information stored in a meteorological rule database on-board the aircraft, wherein the meteorological rule database includes a trigger condition for a sensor on board the aircraft, wherein the trigger condition comprises a threshold measurement for the sensor that indicates the presence of the specific meteorological feature without regard for the geographic location of the aircraft;
receiving, by the computing device, sensor inputs from the sensor on board the aircraft,
determining whether the sensor inputs satisfy the trigger condition, wherein determining whether the sensor inputs satisfy the trigger condition comprises comparing the sensor inputs to the threshold measurement and determining whether the sensor inputs satisfy the threshold measurement for the sensor without regard for the geographic location of the aircraft, wherein determining whether the sensor inputs satisfies the threshold measurement for the sensor comprises at least one of:
  determining if a sensor input of the sensor inputs is greater than the threshold measurement,
  determining if the sensor input is less than the threshold measurement, or
  determining if the sensor input is within threshold levels associated with the threshold measurement;
in response to determining that the sensor inputs satisfy the trigger condition, initiating, by the computing device, a downlink indicating an identification of the specific meteorological feature, wherein initiating the computing device initiates the downlink without regard for the geographic location of the aircraft.

6. The method of claim 5,
wherein the trigger condition is a first trigger condition;
wherein the meteorological rule database also includes meteorological criteria for the specific meteorological feature,
wherein the meteorological criteria comprise the first trigger condition associated with the specific meteorological feature, a second trigger condition associated with the specific meteorological feature, and a third trigger condition,
wherein the second trigger condition comprises a threshold measurement for a second sensor on board the aircraft that indicates the presence of the specific meteorological feature without regard for the geographic location of the aircraft, and
wherein the third trigger condition comprises non-meteorological criteria measured by a non-weather sensor, wherein the non-weather sensor comprises one or more of a datalink capability sensor, a clock, a terrestrial location sensor, a direction sensor, an altitude sensor, an attitude and heading reference system (AHRS), a gyroscopic flight instrument, or an inertial measurement unit (IMU).

7. The method of claim 6, further comprising:
in response to processing the triggering command, determining if a geospatial location of the specific meteorological feature is within a range of detection of the first sensor or the second sensor based on a planned flight path of the aircraft.

8. The method of claim 6, wherein the downlink indicating the identification of the specific meteorological feature comprises meteorological data.

9. The method of claim 6, further comprising:
determining, by the computing device, whether to include in the downlink meteorological data based on the sensor inputs from the first sensor or the second sensor related to the identification of the specific meteorological feature;
determining a time to initiate a downlink of the portion of the meteorological data based on the third trigger condition, without regard for the geographic location of the aircraft; and
transmitting the meteorological data to a ground-based device while the aircraft is in flight.

10. The method of claim 5, wherein receiving the at least one triggering command comprises receiving the at least one triggering command from a ground-based device while the aircraft is in flight.

11. The method of claim 5, wherein the specific meteorological feature comprises one or more of:
wind shear;
a thunderstorm system;
a microburst;
an outflow boundary;
a supercell thunderstorm;
a weather front transition boundary;
icing conditions;
a presence of lightning.

12. The method of claim 5, wherein initiating the downlink comprises initiating, by the computing device, the downlink based a presence of a weather event, without regard for the geographic location of the aircraft.

13. The method of claim 5, further comprising:
translating, by the computing device and based on the comparison of the identification of the specific meteorological feature, the triggering command into meteorological criteria associated with the specific meteorological feature based on the information in the meteorological rule database, wherein the meteorological criteria comprises the trigger condition.

14. An aircraft-based weather system, the system comprising:
a sensor on board an aircraft;
a memory configured to store a meteorological rule database, wherein the meteorological rule database includes one or more trigger conditions for a sensor on board the aircraft, wherein the one or more trigger conditions comprises threshold measurements for the sensor that indicate the presence of a meteorological feature without regard for the geographic location of the aircraft;
a communication unit; and
a computing device implemented in circuitry and configured to:
  receive, via the communication unit, at least one triggering command, wherein the at least one triggering command comprises an identification of the meteorological feature and a request to downlink an indication of the meteorological feature;
  determine, from the meteorological rule database, a threshold measurement of the threshold measurements for the sensor that indicate the presence of the meteorological feature identified by the triggering command;

receive sensor inputs from the sensor;

determine whether the sensor inputs satisfy the threshold measurement for the sensor, without regard for the geographic location of the aircraft;

in response to determining that the sensor inputs satisfy the threshold measurement of the threshold measurements for the sensor that indicate the presence of the meteorological feature identified by the triggering command; initiate a downlink indicating an identification of the meteorological feature, wherein the computing device initiates the downlink without regard for the geographic location of the aircraft.

15. The system of claim 14,
wherein the computing device is further configured to initiate the downlink indicating the identification of the meteorological feature in response to non-meteorological criteria measured by a non-weather sensor, wherein the non-weather sensor comprises at least one of a datalink capability sensor, a clock, a terrestrial location sensor, a direction sensor, an altitude sensor, an attitude and heading reference system (AHRS), or a gyroscopic flight instrument and an inertial measurement unit (IMU).

16. The system of claim 15, wherein the computing device is further configured to, in response to processing the triggering command, determine whether a geospatial location of the meteorological feature is within a range of detection of the first sensor or the second sensor based on a planned flight path of the aircraft.

17. The system of claim 14,
wherein the downlink indicating the identification of the meteorological feature comprises meteorological data, and
wherein the computing device is further configured to:
determine a time to initiate a downlink of a portion of the meteorological data based; and
transmit the meteorological data to a ground-based device while the aircraft is in flight.

18. The system of claim 14, wherein to receive the at least one triggering command, the computing device receives the at least one triggering command from a ground-based device while the aircraft is in flight.

19. The system of claim 14, wherein to initiate the downlink comprises the computing device is configured to initiate the downlink based on a presence of a weather event, without regard for the geographic location of the aircraft.

20. The system of claim 14, wherein the computing device is further configured to translate, based on the comparison of the identification of the meteorological feature, the triggering command into meteorological criteria associated with the meteorological feature based on the information in the meteorological rule database, wherein the meteorological criteria comprises the trigger condition.

* * * * *